(12) United States Patent
Joung et al.

(10) Patent No.: US 10,177,835 B2
(45) Date of Patent: Jan. 8, 2019

(54) ADAPTIVE INTERFERENCE CANCELLATION APPARATUS FOR CANCELLING SIDE LOBE BETWEEN NEIGHBORING CELLS

(71) Applicant: INNOWIRELESS CO., LTD., Gyeonggi-do (KR)

(72) Inventors: Jin-Soup Joung, Gyeonggi-do (KR); Joo-Hyeong Lee, Seoul (KR); Kyoung-Hwan Ju, Gyeonggi-do (KR); June-Hwan Kim, Daejeon (KR)

(73) Assignee: INNOWIRELESS CO., LTD., Seongnam-si, Gyeonggi-do (KR)

( * ) Notice: Subject to any disclaimer, the term of this patent is extended or adjusted under 35 U.S.C. 154(b) by 777 days.

(21) Appl. No.: 14/287,516

(22) Filed: May 27, 2014

(65) Prior Publication Data
US 2015/0333818 A1 Nov. 19, 2015

(30) Foreign Application Priority Data

May 13, 2014 (KR) .......................... 10-2014-0057416

(51) Int. Cl.
*H04B 7/08* (2006.01)
*H04B 7/155* (2006.01)

(52) U.S. Cl.
CPC ....... *H04B 7/15564* (2013.01); *H04B 7/0854* (2013.01); *H04B 7/15585* (2013.01)

(58) Field of Classification Search
CPC ..................... H04B 7/15564; H04B 7/0854
USPC ........................................................ 342/367
See application file for complete search history.

(56) References Cited

U.S. PATENT DOCUMENTS

| | | | | |
|---|---|---|---|---|
| 4,144,412 A | * | 3/1979 | Ito ........................ | H04W 72/085 455/450 |
| 4,698,769 A | * | 10/1987 | McPherson ............ | H04Q 1/442 708/312 |
| 5,649,287 A | * | 7/1997 | Forssen .................... | H01Q 3/26 342/367 |
| 5,903,826 A | * | 5/1999 | Nowak ................. | H04W 16/00 342/367 |
| 6,163,698 A | * | 12/2000 | Leitch ................... | H04W 76/02 455/434 |

(Continued)

*Primary Examiner* — Frank J McGue
(74) *Attorney, Agent, or Firm* — Kaplan Breyer Schwarz, LLP

(57) ABSTRACT

An adaptive interference cancellation apparatus for cancelling a side lobe between neighboring cells installed in a repeater and capable of improving quality of a communication signal and preventing frequent handover by maintaining a serving base station signal among repeater signals and cancelling an interference signal from a neighboring cell is provided. The adaptive interference cancellation apparatus for a side lobe between neighboring cells, which is installed in a mobile communication repeater system comprising an omni-directional antenna, includes: three directional antennas installed around the omni-directional antenna; an output signal selector configured to select and output two of three directional antenna incident signals; and an adaptive noise canceller configured to adaptively filter the two directional antenna incident signals output from the output signal selector, estimate a noise reference signal, and extract a serving base station signal by subtracting the estimated noise reference signal from an omni-directional antenna incident signal.

7 Claims, 2 Drawing Sheets

(56) References Cited

U.S. PATENT DOCUMENTS

| | | | | |
|---|---|---|---|---|
| 6,480,524 B1* | 11/2002 | Smith | ............... | H04B 7/0408 |
| | | | | 342/373 |
| 8,818,002 B2* | 8/2014 | Tashev | .................. | G01S 3/86 |
| | | | | 381/92 |
| 8,884,819 B2* | 11/2014 | Wu | .................. | H04B 7/0602 |
| | | | | 342/367 |
| 2007/0069962 A1* | 3/2007 | Lucidarme | ............ | H01Q 1/242 |
| | | | | 343/702 |
| 2010/0272218 A1* | 10/2010 | Yeh | .................... | H04B 7/024 |
| | | | | 375/330 |

* cited by examiner

ADAPTIVE INTERFERENCE CANCELLATION APPARATUS FOR CANCELLING SIDE LOBE BETWEEN NEIGHBORING CELLS

CROSS-REFERENCE TO RELATED APPLICATION

This application claims priority to and the benefit of Korean Patent Application No. 10-2014-0057416, filed on May 13, 2014, the disclosure of which is incorporated herein by reference in its entirety.

BACKGROUND

1. Field of the Invention

The present invention relates to an adaptive interference cancellation apparatus for cancelling a side lobe between neighboring cells, and snore particularly, to an adaptive interference cancellation apparatus for cancelling a side lobe between neighboring cells which is installed in a repeater and can improve quality of a communication signal and prevent frequent handover by maintaining a serving base station signal among repeater signals and cancelling an interference signal from a neighboring cell.

2. Discussion of Related Art

In a mobile communication system, technology for cancelling interference of a base station signal between neighboring cells is very important technology for maintaining a quality of a serving base station signal.

Recently, as the prevalence of smart phones has expanded, wireless internet traffic is has been rapidly increasing. In order to solve this problem, more base stations are being installed, and cell radii of base stations are decreasing. Accordingly, as an intensity of a so-called side lobe which is an interference signal by a new base station input to a conventional repeater system which is installed in a radio wave shaded area such as an underground parking lot, etc. and reradiates by low-noise amplification of a base station signal increases, quality of the mobile communication signal is lowered. That is, since an interference signal by a newly-installed base station is mixed in the serving base station signal input to the conventional repeater system to cancel the radio wave shaded area, there is a problem in which the quality of a mobile communication signal is lowered and frequent handover occurs.

Meanwhile, as a conventional art to cancel the interference signal from a neighboring cell, there is a method (refer to "conventional art 1" described below) of cancelling a pilot signal of a neighboring base station using characteristics of a pseudo noise (PN) code lowering an intensity of a signal other than its own signal at a very low level through inverse diffusion in a code division multiple access (CDMA)-based mobile communication system.

In an orthogonal frequency division multiplexing access (OFDMA)-based mobile communication system, as a conventional art for cancelling an interference signal from a neighboring cell, there is a method (refer to "conventional art 2" described below) of using a carrier to noise interference ratio (CINR) of signals received from neighboring base stations and a serving base station.

However, since conventional art 1 described above is technology using a unique PN code, conventional art 1 cannot be applied to an OFDMA-based mobile communication system such as a Long Term Evolution (LTE) system, and conventional art 2 is technology which is applied not to a repeater which is a transmitter but to a receiver, that is, a user terminal, to improve reception performance.

SUMMARY OF THE INVENTION

The present invention is directed to an adaptive interference cancellation apparatus for cancelling a side lobe between neighboring cells which is installed in a repeater and can improve quality of a communication signal and prevent frequent handover by cancelling an interference signal from a neighboring cell while maintaining a serving base station signal among repeater signals.

According to one aspect of the present invention, there is provided an adaptive interference cancellation apparatus for a side lobe between neighboring cells, which is installed in a mobile communication repeater system including an omni-directional antenna, including: three directional antennas installed around the omni-directional antenna; an output signal selector configured to select and output two of three directional antenna incident signals; and an adaptive noise canceller configured to adaptively filter the two directional antenna incident signals output from the output signal selector, estimate a noise reference signal, and extract a serving base station signal by subtracting the estimated noise reference signal from an omni-directional antenna incident signal.

In the construction described above, the three directional antennas may be sector antennas installed at equal angles around the omni-directional antenna.

The adaptive noise canceller may include: two adaptive filters configured to adaptively filter the two directional antenna incident signals and estimate the noise reference signal; an adder configured to subtract the noise reference signal output from each of the two adaptive filters from the omni-directional antenna incident signal; and a filter coefficient adjustment unit configured to adjust a filter coefficient of each of the two adaptive fillers to minimize an error signal which is the output signal of the adder.

The filter coefficient adjustment unit may adjust the filter coefficient of each of the two adaptive filters through a least mean square algorithm to minimize the error signal.

According to another aspect of the present invention, there is provided an adaptive interference cancellation apparatus for a side lobe between neighboring cells, which is installed in a mobile communication repeater system, including: three directional antennas; an output signal selector configured to select and output two of three directional antenna incident signals; and an adaptive noise canceller configured to adaptively filter the two directional antenna incident signals output from the output signal selector, estimate a noise reference signal, and extract a serving base station signal by subtracting the estimated noise reference signal from the one directional antenna incident signal which is not selected by the output signal selector.

In the construction described above, the three directional antennas may be sector antennas installed at equal angles.

The adaptive noise canceller may include: two adaptive filters configured to adaptively filter the two directional antenna incident signals and estimate the noise reference signal; an adder configured to subtract the noise reference signal output from each of the two adaptive filters from the one directional antenna incident signal; and a filter coefficient adjustment unit configured to adjust a filter coefficient of each of the two adaptive filters to minimize an error signal which is the output signal of the adder.

The filter coefficient adjustment unit may adjust the filter coefficient of each of the two adaptive filters through a least mean square algorithm to minimize the error signal.

According to still another aspect of the present invention, there is provided an adaptive interference cancellation apparatus for a side lobe between neighboring cells, including: three directional antennas; three adaptive interference cancellation units, each comprising an adaptive noise canceller configured to adaptively niter two of three directional antenna incident signals, estimate a noise reference signal, and extract a serving base station signal by subtracting the estimated noise reference signal from one directional antenna incident signal; and a multiplexer configured to selectively output one having the smallest value among the output signals of the three adaptive interference cancellation units.

In the construction described above, each of the three adaptive interference cancellation units may include: an output signal selector configured to selectively output two of three directional antenna incident signals; and an adaptive noise canceller configured to adaptively filter the two directional antenna incident signals output from the output signal selector, estimate a noise reference signal, and extract a serving base station signal by subtracting the estimated noise reference signal from the one directional antenna incident signal which, is not selected by the output signal selector.

The three directional antennas may be sector antennas installed at equal angles.

Each of the adaptive noise canceller may include: two adaptive filters configured to adaptively filter the two directional antenna incident signals and estimate the noise reference signal; an adder configured to subtract the noise reference signal output from each of the two adaptive filters from the one directional antenna incident, signal; and a filter coefficient adjustment unit configured to adjust a filter coefficient of each of the two adaptive filters to minimize an error signal which is the output signal of the adder.

The filter coefficient adjustment, unit may adjust the filter coefficient of each of the two adaptive filters through a least mean square algorithm to minimize the error signal.

BRIEF DESCRIPTION OF THE DRAWINGS

The above and other objects, features and advantages of the present invention will, become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications cars be made without departing from the spirit and scope of the invention.

Figure 1:
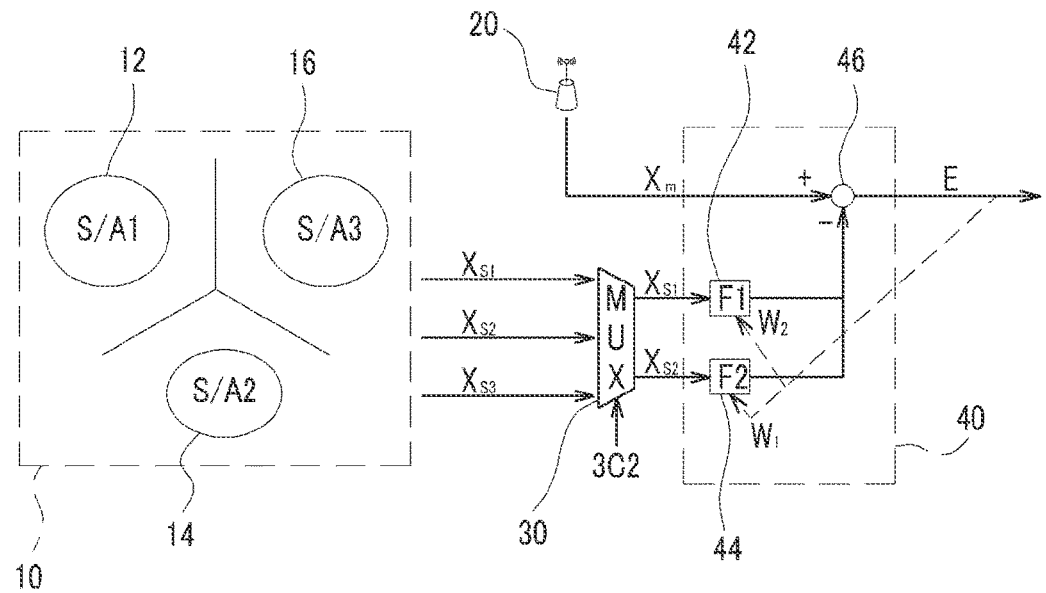
FIG. 1 is a block, diagram illustrating an adaptive interference cancellation apparatus for cancelling a side lobe between neighboring cells according to one exemplary embodiment of the present invention.

FIG. 1 is a block diagram illustrating an adaptive interference cancellation apparatus for cancelling a side lobe between neighboring cells according to one exemplary embodiment of the present invention, and illustrates an example which is applied to a conventional mobile communication repeater system.

As shown in FIG. 1, a conventional mobile communication repeater system may perform low-noise amplification on a serving base station signal, and reradiate the low-noise amplified signal to a radio wave shaded area such as an underground parking lot etc. through an omni-directional antenna 20. Accordingly, every base station signal of the serving cell as well as the neighboring cells may be incident to the omni-directional antenna 20.

Meanwhile, in this process, a side lobe excluding a main beam radiated from a new base station antenna may be mixed with the serving base station signal through the omni-directional antenna 20, and to cancel this side lobe in the apparatus of the present invention, three directional antennas 10 for receiving base station signals of the serving cell and the neighboring cells, for example, three sector antennas (S/A1, S/A2, and S/A3) 12, 14 and 16, may be further installed.

In FIG. 1, a dotted oval represents a horizontal radiation (incident) pattern of each of the sector antennas 12, 14, and 16, and a conventional sector antenna may have a beam width of 66°, In the present invention, three sector antennas 12, 14 and 16 may be installed at equal angles of 120° around the omni-directional antenna 20 in a radio wave shaded area, for example, in an upper space of the omni-directional antenna 20, and receive base station signals incident in a corresponding direction.

In FIG. 1, reference numeral 30 designates an output signal selector for selecting only two among the three sector antenna incident signals $X_{s1}$, $X_{s2}$ and $X_{s3}$, and the two incident signals selected by the output signal selector (MUX) 30 may be input to an adaptive noise canceller 40 as an interference signal. With reference to FIG. 1, an example in which the incident signals $X_{s1}$ and $X_{s2}$ of the first and second sector antennas 12 and 14 are selected as the interference signals will be described below.

Meanwhile, the adaptive noise canceller 40 may adaptively filter the two sector antenna incident signals $X_{s1}$ and $X_{s2}$ output from the output signal selector 30, estimate a noise reference signal, and extract only the serving base station signal by subtracting the estimated noise reference signal from an incident signal $X_m$ of the omni-directional antenna 20. The following Equation 1 is for explaining an operation of the adaptive noise canceller 40.

$$E(n)=X_m(n)-[W_{1,i}^{*}*X_{s1}(n)+W_{2,i}^{*}*X_{s2}(n)] \quad [\text{Equation 1}]$$

In Equation 1, E(n), $X_m(n)$, $X_{s1}(n)$, and $X_{s2}(n)$ represent an output signal of the adaptive noise canceller 40, an output signal of the omni-directional antenna 20, and output signals of the first and the second sector antennas 12 and 14 output by being sampled in an arbitrary sample index n, respectively. That is, the adaptive noise canceller 40 may adjust filter coefficients $W_{1,i}^{*}$ and $W_{2,i}^{*}$ of the adaptive filters (F1 and F2) 42 and 44, for example, through a least mean square algorithm, to minimize the error signal E(n) obtained by subtracting the incident signals $X_{s1}(n)$ and $X_{s2}(n)$ sampled by the two sector antennas from the incident signal $X_m(n)$ sampled by the omni-direetional antenna 20 using an adder 46. The filter coefficient adjustment algorithm maybe implemented in software or by a hardware operator.

In Equation 1, the filter coefficients $W^*_{1,i}$ and $W^*_{2,i}$ obtained by feeding the error signal E(n) back to the adaptive filters 42 and 44 may be obtained by the following Equations 2 and 3, respectively.

$$W_{1,i+1}=(1-\alpha)*W_{1,i}+\alpha*W_1(t) \quad \text{[Equation 2]}$$

$$W_{2,i+1}=(1-\alpha)*W_{2,i}+\alpha*W_2(t) \quad \text{[Equation 3]}$$

Meanwhile, in Equations 2 and 3, α designates a weight value reduction coefficient in an exponentially weighted moving average (EWMA) method which is a kind of smooth weight value calculation method, is given as a value which is larger than 0 and smaller than 1, and reduces exponentially in proportion to the age of data.

In Equations 2 and 3, $W^*_{1,i}$ and $W^*_{2,i}$ calculated in an arbitrary time frame i may be obtained by dividing added cross-correlation values by a sampling size N, respectively, after adding cross-correlation values of an incident signal $X_{m,i}(n)$ sampled by the omni-directional antenna 20 and incident signals $X^*_{s1,i}(n)$ and $X^*_{s2,i}(n)$ sampled by the sector antennas 12 and 14, as shown in the following Equations 4 and 5, and the sampling size N may be given as 2048 for each time frame i.

$$W_1(i) = 1/N \sum_{n=0}^{N-1} X^*_{s1,i}(n) * X_{m,i}(n) \quad \text{[Equation 4]}$$

$$W_2(i) = 1/N \sum_{n=0}^{N-1} X^*_{s2,i}(n) * X_{m,i}(n) \quad \text{[Equation 5]}$$

Meanwhile, in Equations 4 and 5, the incident signal $X_{m,i}$ sampled by the omni-directional antenna 20 and the incident signals $X_{s1,i}$ and $X_{s2,i}$ sampled by the sector antennas 12 and 14 may be obtained by the following Equations 6 to 8, respectively.

$$X_{m,i}=[X_{m,i}(n) \ldots X_{m,i}(n+N-1)]^T \quad \text{[Equation 6]}$$

$$X_{s1,i}=[X_{s1,i}(n) \ldots X_{s1,i}(n+N-1)]^T \quad \text{[Equation 7]}$$

$$X_{s2,i}=[X_{s2,i}(n) \ldots X_{s2,i}(n+N-1)]^T \quad \text{[Equation 8]}$$

For example, two output signals of the output signal selector 30 in an interference cancellation apparatus according to one exemplary embodiment shown in FIG. 1 may be obtained by selecting two sector antenna incident signals when a value of the output signal of the adaptive noise canceller 40 is the smallest after obtaining every output signal of the adaptive noise canceller 40 while excluding one sector antenna incident signal.

Figure 2:
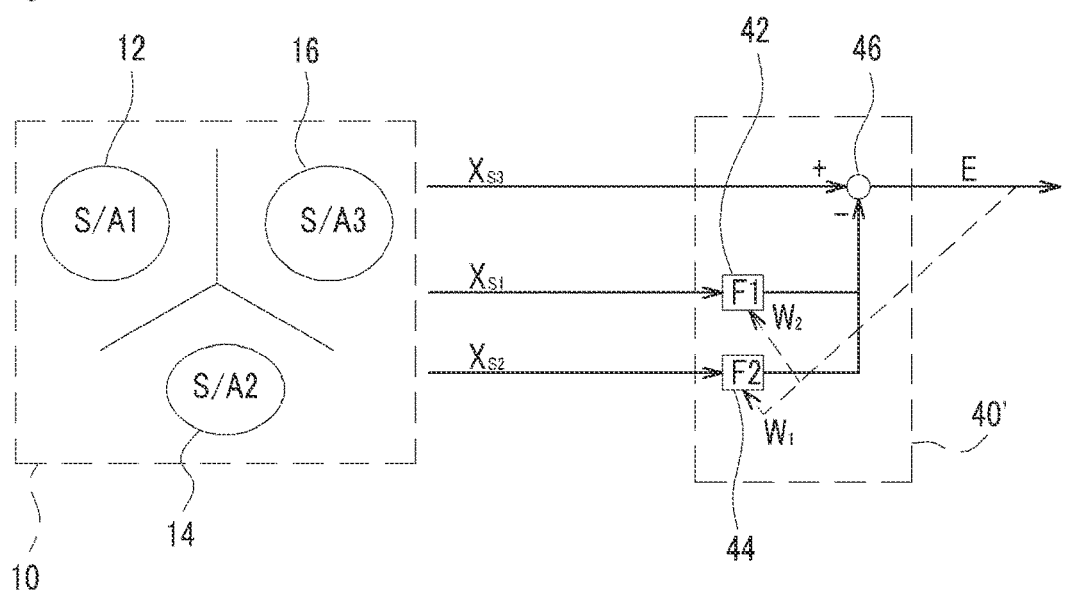
FIG. 2 is a block diagram illustrating an adaptive interference cancellation apparatus for cancelling a side lobe between neighboring cells according to another exemplary embodiment of the present invention.

FIG. 2 is a block diagram illustrating an adaptive interference cancellation apparatus for cancelling a side lobe between, neighboring cells according to another exemplary embodiment of the present invention. As shown in FIG. 2, an apparatus of the present invention applied to a newly installed mobile communication repeater system may use only three sector antennas (S/A1, S/A2, and S/A3) 12, 14, and 16 without requiring the omni-directional antenna 20. That is, one of the three antenna incident signals $X_{s1}$, $X_{s2}$ and $X_{s3}$, for example, $X_{s3}$, may be set as a serving base station signal, and the remaining two signals, for example, $X_{s1}$ and $X_{s2}$, may be set as interference signals from a neighboring cell.

Accordingly, the output signal selector 30 may output the two sector antenna incident signals $X_{s1}$ and $X_{s2}$ among the three antenna incident signals $X_{s1}$, $X_{s2}$ and $X_{s3}$.

Meanwhile, an adaptive noise canceller 40' may adaptively filter the two sector antenna incident signals $X_{s1}$ and $X_{s2}$ output from the output signal selector 30, estimate a noise reference signal, and extract only a serving base station signal by subtracting the estimated noise reference signal from one sector antenna incident signal $X_{s3}$. The following Equation 9 is for explaining an operation of the adaptive noise canceller 40'.

$$E(n)=X_{s3}(n)-[W^*_{1,i}*X_{s1}(n)+W^*_{2,i}*X_{s2}(n)] \quad \text{[Equation 9]}$$

In Equation 9, E(n), $X_{s1}(n)$, $X_{s2}(n)$, and $X_{s3}(n)$ represent an output signal of the adaptive noise canceller 40', and output signals of the first to third sector antennas 12, 14, and 16 output by being sampled in an arbitrary sample index n, respectively. That is, the adaptive noise canceller 40' may adjust filter coefficients $W^*_{1,i}$ and $W^*_{2,i}$ of the adaptive filters (F1 and F2) 42 and 44, for example, through a least mean square algorithm, to minimize the error signal E(n) obtained by subtracting the incident signals $X_{s1}(n)$ and $X_{s2}(n)$ sampled by the two sector antennas from the incident signal $X_{s3}(n)$ sampled by the sector antenna 16 using an adder 46.

In Equation 9, the filter coefficients $W^*_{1,i}$ and $W^*_{2,i}$ obtained by feeding the error signal E(n) back to the adaptive filters 42 and 44 may be obtained by Equations 2 and 3 described above.

In Equations 2 and 3, $W^*_{1,i}$ and $W^*_{2,i}$ calculated in an arbitrary time frame i may be obtained by dividing each of added cross-correlation values by a sampling size N after adding cross-correlation values of the incident signal $X_{s3}(n)$ sampled by the sector antenna 16 and the incident signals $X^*_{s1,i}(n)$ and $X^*_{s2,i}(n)$ sampled by the sector antennas 12 and 14, as shown in the following Equations 10 and 11, and the sampling size N may be given as 2048 for each time frame i.

$$W_1(i) = 1/N \sum_{n=0}^{N-1} X^*_{s1,i}(n) * X_{s3,i}(n) \quad \text{[Equation 10]}$$

$$W_2(i) = 1/N \sum_{n=0}^{N-1} X^*_{s2,i}(n) * X_{s3,i}(n) \quad \text{[Equation 11]}$$

Meanwhile, in Equations 10 and 11, the incident signals $X^*_{s1,i}(n)$ and $X^*_{s2,i}(n)$ sampled by the sector antennas 12 and 14 may each be obtained by determinants of Equations 6 to 8 described above, and the incident signal $X_{s3,i}$ sampled by the sector antenna 16 may be obtained by a determinant of the following Equation 12.

$$X_{s3,i}=[X_{s3,i}(n) \ldots X_{s3,i}(n+N-1)]^T \quad \text{[Equation 12]}$$

For example, two output signals of the output signal selector 30 in an interference cancellation apparatus according to another exemplary embodiment shown in FIG. 2 may be obtained by selecting two sector antenna incident signals when a value of the output signal of the adaptive noise canceller 40' is the smallest after obtaining every output signal of the adaptive noise canceller 40' while setting one sector antenna incident signal as the serving base station signal.

Figure 3:
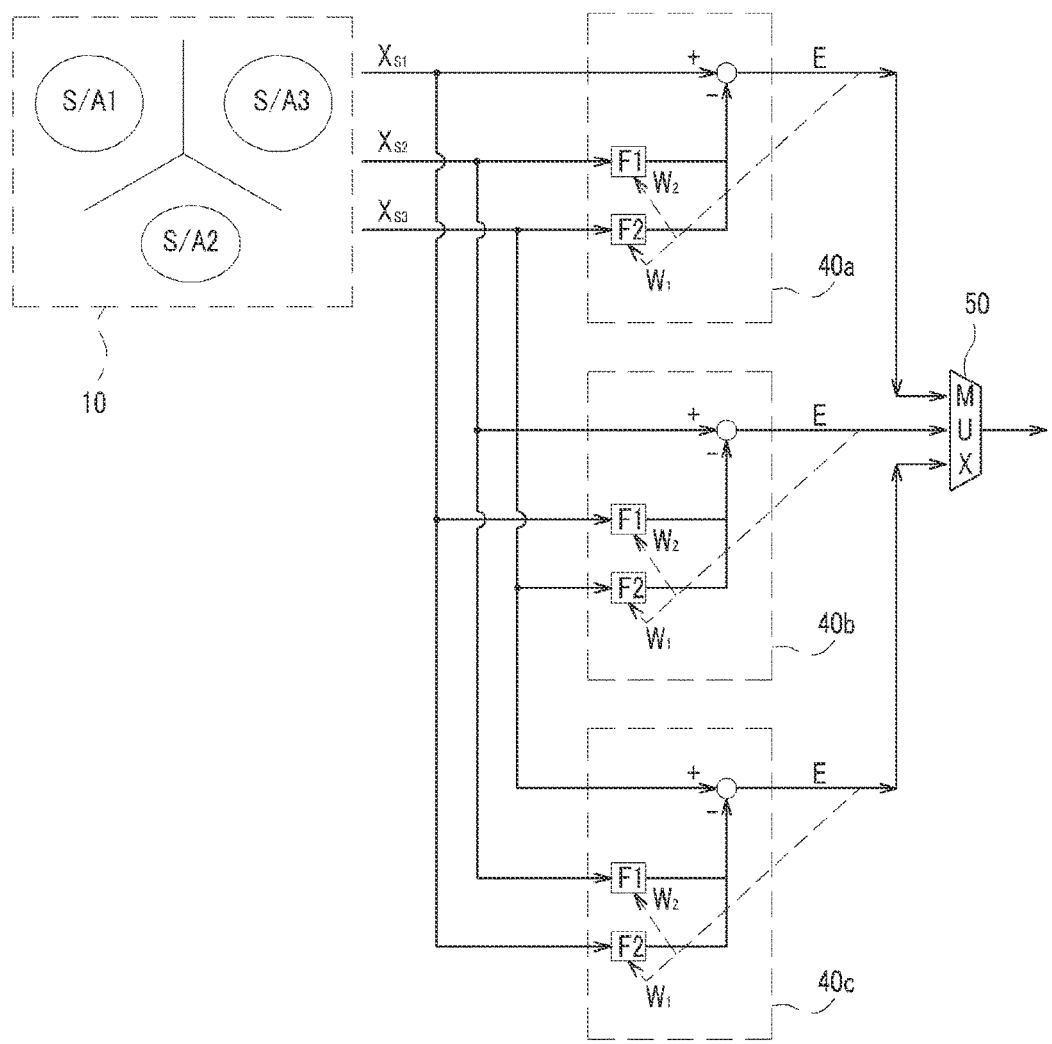
FIG. 3 is a block diagram illustrating a repeater system to which the adaptive interference cancellation apparatus shown in FIG. 2 is applied.

FIG. 3 is a block diagram illustrating a repeater system to which the adaptive interference cancellation apparatus shown in FIG. 2 is applied. A mobile communication repeater system shown in FIG. 3 may include three adaptive noise cancellers 40*a*, 40*b*, and 40*c* setting each of three sector antenna incident signals as a serving base station signal, and may selectively output only an output signal of the adaptive noise canceller outputting the smallest value among real-time output signals of the adaptive noise cancellers 40*a*, 40*b*, and 40*c* though a multiplexer (MUX) 50.

The adaptive interference cancellation apparatus for cancelling the side lobe between the neighboring cells of the present invention may be applied to a previously installed or newly installed mobile communication repeater system in a radio wave shaded area, and can provide a high-quality mobile communication signal for a user by effectively cancelling only the side lobe which is an interference signal from the neighboring signal in a base station signal of a serving cell through a simple structure even in an area in which base stations are densely installed.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An adaptive interference cancellation apparatus for a side lobe between neighboring cells, which is installed in a mobile communication repeater system comprising an omni-directional antenna, comprising:
   three directional antennas installed around the omni-directional antenna, the three directional antennas configured to output three directional antenna incident signals of a neighboring cell;
   an output signal selector; and
   an adaptive noise canceller;
   wherein the output signal selector is configured to select two of the three directional antenna incident signals of the neighboring cell and input the selected two directional antenna incident signals of the neighboring cell directly to the adaptive noise canceller, wherein the two selected antenna incident signals are selected by comparing output signals of the adaptive noise canceller that are obtained with all possible combinations of two directional antenna incident signals and selecting the two directional antenna incident signals that results in the smallest output signal value of the adaptive noise canceller;
   wherein the adaptive noise canceller comprises:
   two adaptive filters configured to adaptively filter the selected two directional antenna incident signals of the neighboring cell and estimate the noise reference signal;
   an adder configured to subtract the noise reference signal output from each of the two adaptive filters from the omni-directional antenna incident signal for extracting a serving base signal; and
   a filter coefficient adjustment unit configured to adjust a filter coefficient of each of the two adaptive filters to minimize an error signal which is an output signal of the adder.

2. The adaptive interference cancellation apparatus for the side lobe between the neighboring cells of claim 1, wherein the three directional antennas are sector antennas installed at equal angles around the omni-directional antenna.

3. The adaptive interference cancellation apparatus for the side lobe between the neighboring cells of claim 1, wherein the filter coefficient adjustment unit adjusts the filter coefficient of each of the two adaptive filters through a least mean square algorithm to minimize the error signal.

4. An adaptive interference cancellation apparatus for a side lobe between neighboring cells, which is installed in a mobile communication repeater system, comprising:
   three directional antennas configured to output three directional antenna incident signals of a neighboring cell;
   an output signal selector configured to select and output one of the three directional antenna incident signals as a serving base station signal and to select and output the remaining two directional antenna incident signals as incident signals of the neighboring cell; and
   an adaptive noise canceller;
   wherein the output signal selector is configured to input the selected two directional antenna incident signals of the neighboring cell directly to the adaptive noise canceller, wherein the two antenna incident signals selected as incident signals of the neighboring cells are selected by comparing output signals of the adaptive noise canceller that are obtained with all possible combinations of two directional antenna incident signals and selecting the two directional antenna incident signals that results in the smallest output signal value of the adaptive noise;
   wherein the adaptive noise canceller comprises:
   two adaptive filters configured to adaptively filter the selected two directional antenna incident signals of the neighboring cell and estimate the noise reference signal;
   an adder configured to subtract the noise reference signal output from each of the two adaptive filters from the directional antenna incident signal selected as a serving base station signal; and
   a filter coefficient adjustment unit configured to adjust a filter coefficient of each of the two adaptive filters to minimize an error signal which is an output signal of the adder.

5. The adaptive interference cancellation apparatus for the side lobe between the neighboring cells of claim 4, wherein the three directional antennas are sector antennas installed at equal angles.

6. The adaptive interference cancellation apparatus for the side lobe between the neighboring cells of claim 4, wherein the filter coefficient adjustment unit adjusts the filter coefficient of each of the two adaptive filters through a least mean square algorithm to minimize the error signal.

7. An adaptive interference cancellation apparatus for a side lobe between neighboring cells, comprising:
   first, second and third directional antennas configured to output first, second and third directional antenna incident signals of a neighboring cell, respectively;
   a first adaptive interference cancellation unit, comprising a first adaptive noise canceller configured to: (a) adaptively filter the second and third directional antenna incident signals of the neighboring cell inputted directly the second and third directional antennas, respectively; (b) estimate a noise reference signal; and (c) extract and output a first serving base station signal by subtracting the estimated noise reference signal from the first directional antenna incident signal;
   a second adaptive interference cancellation unit, comprising a second adaptive noise canceller configured to: (a) adaptively filter the third and first directional antenna incident signals of the neighboring cell inputted directly the third and first directional antennas, respectively; (b) estimate a noise reference signal; and (c)

extract and output a second serving base station signal by subtracting the estimated noise reference signal from the second directional antenna incident signal;

a third adaptive interference cancellation unit, comprising a third adaptive noise canceller configured to: (a) adaptively filter the first and second directional antenna incident signals of the neighboring cell inputted directly the first and second directional antennas, respectively; (b) estimate a noise reference signal; and (c) extract and output a third serving base station signal by subtracting the estimated noise reference signal from the third directional antenna incident signal; and a multiplexer configured to selectively output one of the first, second and third serving base station signal having the smallest signal value.

* * * * *